(12) United States Patent
Zheng et al.

(10) Patent No.: US 11,913,186 B2
(45) Date of Patent: Feb. 27, 2024

(54) IN-SITU TEST SYSTEM AND METHOD FOR SUBGRADE DYNAMIC RESILIENT MODULUS

(71) Applicant: CHANGSHA UNIVERSITY OF SCIENCE AND TECHNOLOGY, Hunan (CN)

(72) Inventors: Jianlong Zheng, Changsha (CN); Junhui Zhang, Changsha (CN); Junhui Peng, Changsha (CN)

(73) Assignee: CHANGSHA UNIVERSITY OF SCIENCE AND TECHNOLOGY, Changsha (CN)

( * ) Notice: Subject to any disclaimer, the term of this patent is extended or adjusted under 35 U.S.C. 154(b) by 336 days.

(21) Appl. No.: 17/617,451

(22) PCT Filed: Aug. 29, 2020

(86) PCT No.: PCT/CN2020/112297
§ 371 (c)(1),
(2) Date: Dec. 8, 2021

(87) PCT Pub. No.: WO2021/077899
PCT Pub. Date: Apr. 29, 2021

(65) Prior Publication Data
US 2022/0298737 A1 Sep. 22, 2022

(30) Foreign Application Priority Data
Oct. 23, 2019 (CN) .......................... 201911008905.2

(51) Int. Cl.
*E02D 1/00* (2006.01)
*G01N 3/36* (2006.01)
(Continued)

(52) U.S. Cl.
CPC ................. *E02D 1/00* (2013.01); *G01D 5/14* (2013.01); *G01N 3/36* (2013.01); *G01S 19/01* (2013.01)

(58) Field of Classification Search
CPC .. G01N 3/08; G01N 3/10; G01N 3/12; G01N 3/14; G01N 3/16; G01N 3/165;
(Continued)

(56) References Cited

U.S. PATENT DOCUMENTS 5,753,808 A    5/1998  Johnson
2005/0022585 A1*  2/2005  Berkman .................. E02D 1/02
                                                      73/78
(Continued)

FOREIGN PATENT DOCUMENTS

CN    102466598 A    5/2012
CN    203259434 U    10/2013
(Continued)

OTHER PUBLICATIONS

Feng et al., "Moving Truck-Induced Dynamic Response of Asphalt Pavement Supported by Subgrade with Non-uniform Modulus," China Civil Engineering Journal, vol. 51, No. 3, 2018, pp. 1-8.

*Primary Examiner* — Herbert K Roberts
(74) *Attorney, Agent, or Firm* — MagStone Law, LLP; Enshan Hong

(57) ABSTRACT

A loading module includes a test vehicle, a servo cylinder is mounted on the test vehicle, a piston rod of the servo cylinder is connected with a bearing plate acting on a subgrade surface, an annular loading plate is disposed around the bearing plate, and the loading plate is connected, through a force transmission rod, with a bearing tray on which a counterweight block is placed; a data collecting module includes a second high precision displacement sensor and a plurality of first high precision displacement sensors; a data processing module includes a computer, the
(Continued)

computer is connected with a signal input end of the servo cylinder, an output end of the first high precision displacement sensor and an output end of the second high precision displacement sensor respectively, and performs inverse calculation for a dynamic resilient modulus value of a subgrade using a software.

17 Claims, 2 Drawing Sheets

(51) Int. Cl.
*G01D 5/14* (2006.01)
*G01S 19/01* (2010.01)

(58) Field of Classification Search
CPC ........... G01N 3/18; G01N 3/30; G01N 3/303; G01N 3/307; G01N 3/31; G01N 3/313; G01N 3/317; G01N 3/32; G01N 3/34; G01N 3/36; G01N 3/38; E02D 1/00; E02D 1/02; E02D 1/022; E02D 1/08
See application file for complete search history.

(56) References Cited

U.S. PATENT DOCUMENTS

| | | | | |
|---|---|---|---|---|
| 2005/0199045 | A1* | 9/2005 | Briaud | G01N 3/40 73/84 |
| 2013/0283925 | A1* | 10/2013 | White | G01N 3/40 73/825 |
| 2015/0316526 | A1* | 11/2015 | Kimmel | E02D 1/022 73/818 |
| 2016/0003724 | A1* | 1/2016 | Benz Navarrete | G01N 3/42 73/84 |
| 2022/0011205 | A1* | 1/2022 | Yang | G01N 3/08 |

FOREIGN PATENT DOCUMENTS

| | | | | |
|---|---|---|---|---|
| CN | 105181498 | A | * 12/2015 | |
| CN | 207331417 | U | 5/2018 | |
| CN | 108169005 | A | * 6/2018 | ............... G01N 3/02 |
| CN | 109356008 | A | 2/2019 | |
| CN | 110749518 | A | 2/2020 | |
| DE | 19629710 | A1 | * 1/1998 | ............. E02D 1/022 |
| KR | 1020010098994 | A | 11/2001 | |
| KR | 200269540 | Y1 | * 3/2002 | |
| KR | 100526015 | B1 | * 11/2005 | |
| KR | 20120043423 | A | * 5/2012 | |
| RU | 2236673 | C1 | * 9/2004 | |
| RU | 2365916 | C1 | * 8/2009 | |
| RU | 2540432 | C1 | * 2/2015 | |
| RU | 2548725 | C1 | * 4/2015 | |

* cited by examiner

IN-SITU TEST SYSTEM AND METHOD FOR SUBGRADE DYNAMIC RESILIENT MODULUS

CROSS REFERENCE TO RELATED APPLICATIONS

This application claims priority to Chinese Patent Application No. 201911008905.2 entitled "IN-SITU TEST SYSTEM AND METHOD FOR SUBGRADE DYNAMIC RESILIENT MODULUS" filed on Oct. 23, 2019.

TECHNICAL FIELD

The present invention relates to the field of traffic engineering technologies, and in particular to an in-situ test system and method for a subgrade dynamic resilient modulus which are particularly applied to designing of rail traffic and acceptance inspection of subgrades in high-end equipment manufacturing field.

BACKGROUND

Subgrade, as basis of roads, provides support to pavement. Subgrade resilient modulus value is one of important design parameters in pavement designs. The subgrade resilient modulus is mainly obtained by indoor test method and in-situ test method. The indoor test method is mainly used in preliminary design to provide reference, and the in-situ test method is mainly used in subgrade acceptance inspection to accurately determine a subgrade resilient modulus and thus the method has decisive effect on subgrade quality. As a result, it is very important to accurately test a subgrade resilient modulus value especially by the in-situ test method. At present, the in-situ test method for a subgrade resilient modulus mainly includes bearing plate method, Benkelman beam method, falling weight deflectometer (FWD) method, and portable falling weight deflectometer (PFWD) method.

In the bearing plate method, level-by-level loading and unloading are performed for a subgrade soil using a steel plate having a diameter of 30 cm to test a resilient deformation under each level of load, so as to calculate a subgrade resilient modulus. In the Benkelman beam method, a subgrade resilient deflection value under a vehicle load is tested based on lever principle and converted into a subgrade resilient modulus. In the above two methods, the test results both are a static resilient modulus and there are disadvantages of many detection personnel and slow detection speed and the like.

In the FWD method, an impact load generated by a free fall of a falling weight is applied to the loading plate on a test point to inversely calculate a resilient modulus of each structural layer (including subgrade) of a pavement based on deformation information of different test points. Bituminous Pavement Designing Regulations (version 2017) of China in force states the load is 50 kN and the radius of the bearing plate is 150 mm when deflection acceptance inspection is performed for a subgrade top surface using the FWD method. Calculation shows that a pressure borne by the bearing plate is 700 kPa which is equal to a standard tyre pressure acting on a pavement surface during the bituminous pavement design. However, the existing research measurement data shows that a maximum axial stress generated on the subgrade top surface even under the standard axle load of 1.5 times is only 21 kPa, which is far smaller than the load 700 kPa applied using the FWD method during the subgrade deflection acceptance inspection.

The PFWD method is used to test a dynamic resilient modulus of a subgrade by applying an impact load of lower level based on a principle similar to the FWD method. A large number of field tests show that the dynamic moduli generated based on PFWD are all smaller than the static moduli generated based on the bearing plate method. Generally, under the same conditions, the dynamic resilient modulus of a subgrade is larger than a static resilient modulus of the subgrade. Although the PFWD modulus is a resilient modulus under a dynamic load, it is obviously different from the subgrade dynamic resilient modulus under a repeated vehicle load.

A subgrade, as a support of a pavement structure, has to receive constraint effect of the pavement structure having a given rigidity as well as the vehicle load, thus affecting a force bearing state of the subgrade. Therefore, the impact loads generated based on FWD and PFWD are obviously different from the effect of the repeated vehicle load on the subgrade pavement. Further, the constraint effect of the pavement structure is not considered and thus it is not consistent with the actual force bearing state of the subgrade. Although the test result is a dynamic resilient modulus under a given load, it is difficult to reflect the true conditions of the subgrade structure, leading to lower reliability.

In conclusion, it is necessary to seek an in-situ test system for a subgrade dynamic resilient modulus under a true force bearing state at present. This has become a bottleneck in the design theory and methodology research of durable pavements in highway and railway constructions. Therefore, an in-situ test system and method for a subgrade dynamic resilient modulus is urgently needed to perform in-situ test for a dynamic resilient modulus of a subgrade structure under a vehicle load so as to meet the requirements of rail traffic constructions.

SUMMARY

In order to solve the above technical problems, the present invention provides an in-situ test system for a subgrade dynamic resilient modulus to simultaneously consider and simulate a repeated vehicle load and a constraint of a pavement structure on a subgrade, making a force bearing state more approximate to a true force bearing state. In this system, the load application is more stable and accurate, and more accurate and reliable test result of the subgrade dynamic resilient modulus can be obtained, thus improving the accuracy of highway designing and detection and solving the problems in the prior arts.

Another object of the present invention is to provide an in-situ test method for a subgrade dynamic resilient modulus.

The in-situ test system for a subgrade dynamic resilient modulus provided in the present invention includes a loading module, a data collecting module and a data processing module.

The loading module includes a test vehicle, a servo cylinder is mounted on the test vehicle, a piston rod of the servo cylinder is connected with a bearing plate acting on a subgrade surface, an annular loading plate is disposed around the bearing plate, the bearing plate is located in the center of the loading plate, and the loading plate is connected, through a force transmission rod, with a bearing tray on which a counterweight block is placed.

The data collecting module includes a second high precision displacement sensor and a plurality of first high precision displacement sensors, the second high precision displacement sensor is mounted at the center of the bottom of the bearing plate, the first high precision displacement sensors are mounted on an upper surface of the loading plate and test points of the subgrade surface respectively, the test points of the second high precision displacement sensor and all the first high precision displacement sensors are on a same straight line, all the first high precision displacement sensors are mounted on a cross beam, and the cross beam is mounted on the test vehicle through a lifting device.

The data processing module includes a computer, the computer is connected with a signal input end of the servo cylinder, an output end of the first high precision displacement sensor and an output end of the second high precision displacement sensor respectively, and the computer is used to set a loading waveform, a load size, a loading frequency and a number of loading times of a pre-applied vehicle load of the servo cylinder, receive a resilient deformation displacement value tested by the second high precision displacement sensor and the first high precision displacement sensor, and perform inverse calculation for a dynamic resilient modulus value of a subgrade using a software.

Furthermore, an area of the subgrade surface acted by the bearing plate is consistent with an area of a pavement contacted by a vehicle wheel, and a gap between the bearing plate and the loading plate is 1-2 cm.

Furthermore, the bearing plate is circular and the loading plate is annular.

Furthermore, the bearing plate has a diameter of 30 cm, and the loading plate has an inner diameter of 31-32 cm and an outer diameter of 60 cm.

Furthermore, lower surfaces of the bearing plate and the loading plate are flat and smooth.

Furthermore, the first high precision displacement sensors are symmetrically disposed at both sides of the second high precision displacement sensor, a horizontal distance between the first high precision displacement sensor on the upper surface of the loading plate and the second high precision displacement sensor is minimum, a horizontal distance between the second high precision displacement sensor and other first high precision displacement sensors increases gradually toward both sides, and a distance between the first high precision displacement sensor furthest from the center of the bearing plate and the center of the bearing plate is not greater than 5 m.

Furthermore, a probe of the first high precision displacement sensor on the upper surface of the loading plate is in contact with the upper surface of the loading plate, and probes of other first high precision displacement sensors are in contact with corresponding test points on the subgrade soil through a steel sheet having a diameter of 5 cm.

Furthermore, basal bodies of all the first high precision displacement sensors are penetrated through the cross beam and fixedly connected with the cross beam through a second sensor fixture.

Furthermore, three vertically-disposed protective rods are uniformly arranged around the counterweight block, and with the limitation of the protective rods, the counterweight block, the force transmission rod, the bearing tray and the protective rods join together to apply a loading force to the subgrade surface, with the loading force ranging from 0.25 kN to 5 kN and adjustable 0.25 kN per level.

Furthermore, a magnetostrictive linear displacement sensor is connected with the piston rod of the servo cylinder through a first sensor fixture, a pin of the magnetostrictive linear displacement sensor is fixed on a vehicular frame plate of the test vehicle, and the magnetostrictive linear displacement sensor is in signal connection with the computer; the computer is used to determine whether the piston rod of the servo cylinder telescopes within a scale range according to a position feedback of the piston rod of the servo cylinder.

Furthermore, the piston rod of the servo cylinder is connected with the bearing plate through a connection rod, a load sensor is mounted between the piston rod of the servo cylinder and the connection rod, the load sensor is in signal connection with the computer, and the computer is used to compare a monitoring value of the load sensor with a load value input into the servo cylinder, and correct the input load of the computer to be consistent with the monitoring value of the load sensor when the monitoring value and the input load value are different.

Furthermore, the servo cylinder is mounted on the test vehicle through a first lifting cylinder, the bearing tray is located above the servo cylinder, the force transmission rod penetrates through the vehicular frame plate of the test vehicle, the bearing tray is mounted on the test vehicle through a second lifting cylinder, and the cross beam is mounted on the test vehicle through a third lifting cylinder.

Furthermore, the servo cylinder has a maximum vertical amplitude of ±25 mm with an indication accuracy being ±0.5% FS, a load range being 0-10 kN, a measuring accuracy being ±1% FS and a loading frequency being 0.01-100 HZ.

Furthermore, the first high precision displacement sensor has a measuring range of 0-22 mm, a measuring resolution of 1 μm, and a measuring accuracy of ±0.5% FS.

Furthermore, the test system further includes: any one of Beidou positioning device, Global Positioning System (GPS), Galileo satellite navigation system, and GLONASS system to accurately position a test point coordinate of each in-situ test and send the test point coordinate to the computer.

Furthermore, the test system further includes a trail car for trailing the test vehicle, wherein an oil tank of the trail car provides gasoline source to an electro-hydraulic servo loading system and supplies power to the test system at the same time; the electro-hydraulic servo loading system converts gasoline into a loading power of the servo cylinder.

The present invention further provides an in-situ test method for a subgrade dynamic resilient modulus, which includes the following steps:

at step S1, selecting test points along a same straight line on a subgrade surface to be tested, and leveling the subgrade surface;

at step S2, trailing the test vehicle to the leveled subgrade surface to be tested to enable the bearing plate and the loading plate to be in full contact with the subgrade surface, wherein the center of the bottom of the bearing plate is located at a middle test point, the second high precision displacement sensor and the first high precision displacement sensors are mounted on corresponding test points respectively, and the bearing plate and the loading plate are at horizontal position and spaced apart; mounting an appropriate counterweight block according to a dead weight load of a pavement structure layer, and adjusting the test vehicle to be horizontal and stable;

at step S3, setting a loading waveform, a load size, a loading frequency and a number of loading times of a pre-applied vehicle load of the servo cylinder through the computer;

at step S4, starting the servo cylinder to apply a vehicle load under specified parameters, and transmitting resilient deformation displacement values of various test points to the computer through the first high precision displacement sensors and the second high precision displacement sensor; and at step S5, performing, by the computer, inverse calculation for a dynamic resilient modulus value of a subgrade through a software according to the vehicle load applied by the servo cylinder and the resilient deformation displacement values of various test points of the subgrade surface collected by the first high precision displacement sensor and the second high precision displacement sensor.

The present invention has the following beneficial effects. In the present invention, with the bearing plate and the loading plate, the effect of a vehicle load on a subgrade and a constraint of an overlaid pressure of a pavement structure on the subgrade can be accurately simulated. Considering the effect of the pavement vehicle load and the constraint of the pavement structure at the same time, the force bearing state is made more approximate to a true force bearing state. A subgrade dynamic resilient modulus value is obtained by a computer by performing inverse calculation using a software based on dynamic loads of the tested points and the displacement values of the subgrade structure layer, so as to more truly reflect a more accurate dynamic resilient modulus of the subgrade structure layer under the condition of a dynamic load, which provides more reliable technical support for designing parameters of highways and railways. The present invention applies a cyclic load to the subgrade through the servo cylinder to simulate a vehicle dynamic load by stable loading, and further improve the load application stability and accuracy based on load feedback calibration.

BRIEF DESCRIPTION OF DRAWINGS

In order to more clearly describe the technical solutions in the embodiments of the present disclosure or the prior art, the accompanying drawings required for descriptions of the embodiments or the prior art will be briefly introduced. Apparently, the below-described accompanying drawings are merely some embodiments of the present invention, and other drawings may be obtained by those skilled in the art based on these drawings without paying creative work.

Figure 1:
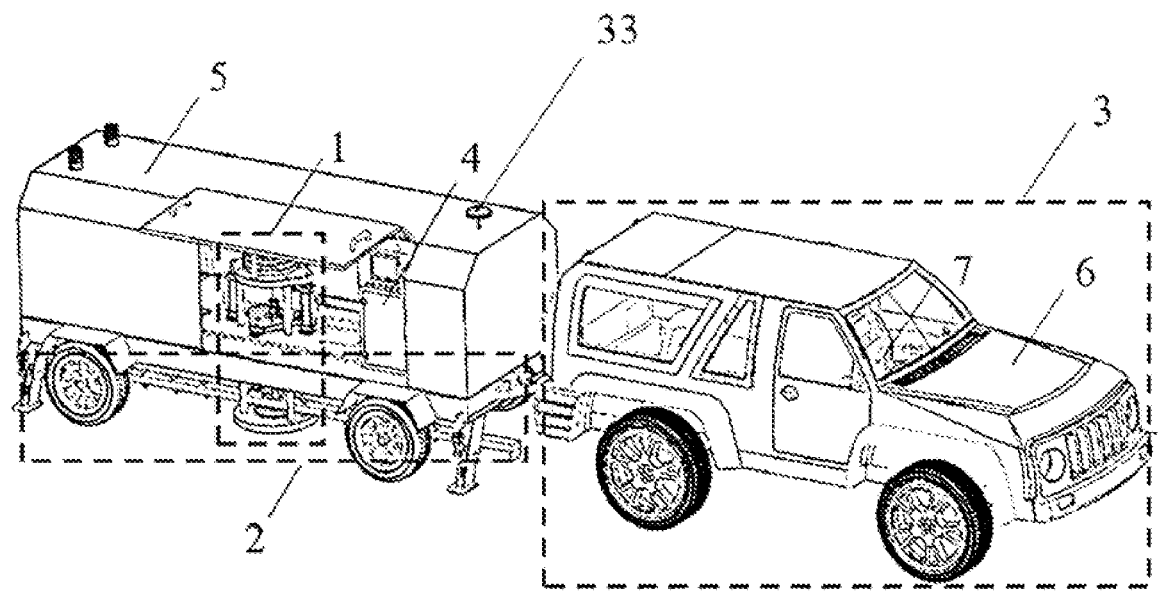
FIG. 1 is a schematic diagram of an overall structure of an in-situ test system for a subgrade dynamic resilient modulus according to an embodiment of the present disclosure.

In the drawings, the reference numerals are described below: 1. loading module, 2. data collecting module, 3. data processing module, 4. a controlling module, 5. test vehicle, 6. a trail car, 7. computer, 8. electro-hydraulic servo loading system, 9. servo cylinder, 10. magnetostrictive linear displacement sensor, 11. first sensor fixture, 12. bearing plate 13. connection rod, 14. load sensor, 15. sensor connector, 16. first lifting cylinder, 17. protective rod, 18. counterweight block, 19. bearing tray, 20. force transmission rod, 21. second lifting cylinder, 22. loading plate, 23. cylinder support leg, 29. first high precision displacement sensor, 30. third lifting cylinder, 31. second sensor fixture, 32. cross beam, 33. Beidou positioning device, and 34. second high precision displacement sensor.

DETAILED DESCRIPTION

The technical solution of the embodiments of the present invention will be fully and clearly described below in combination with the embodiments of the present invention. Apparently, the described embodiments are merely some embodiments of the present invention rather than all embodiments. Other embodiments obtained by those skilled in the art based on these embodiments of the present invention without paying creative work shall fall into the scope of protection of the present invention.

Figure 2:
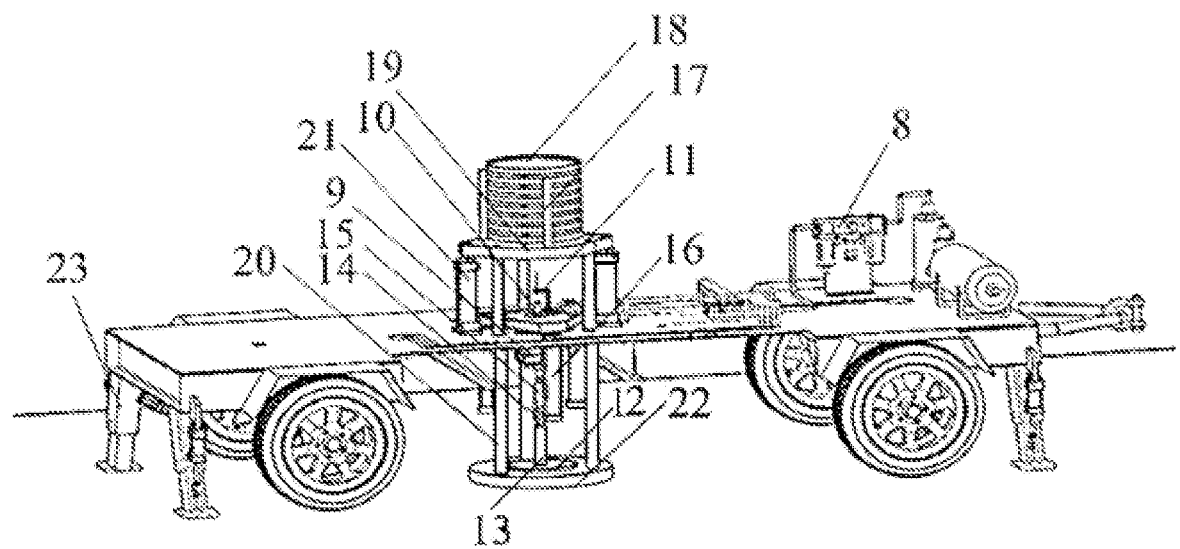
FIG. 2 is a structural schematic diagram of a loading module according to an embodiment of the present invention.
Figure 3:
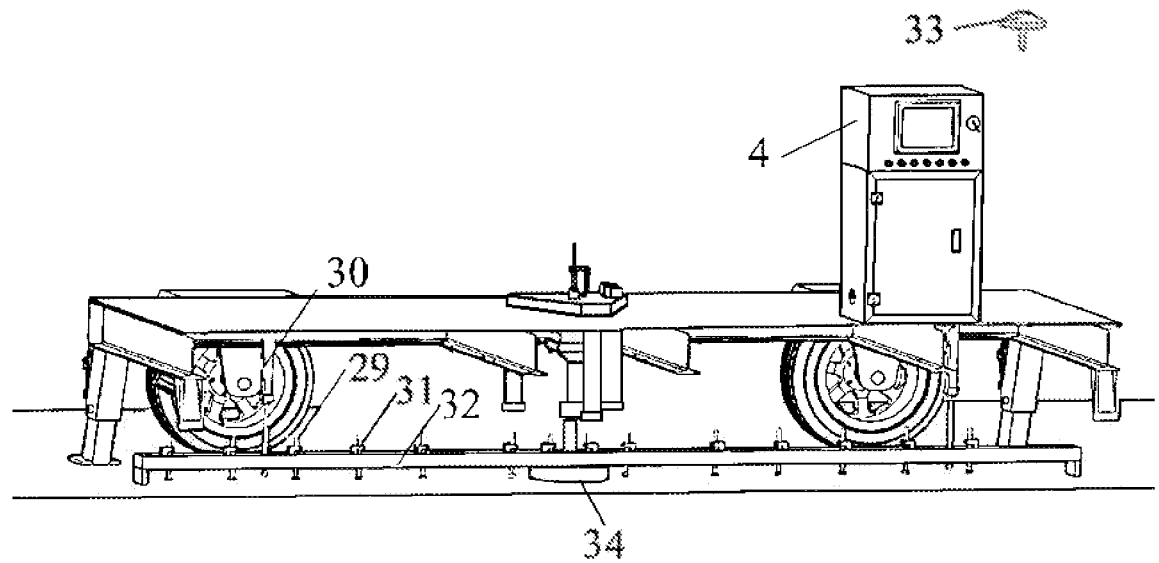
FIG. 3 is a structural schematic diagram of a data collecting module and a controlling module according to an embodiment of the present invention.

One or more embodiments of the present invention provide an in-situ test system for a subgrade dynamic resilient modulus. As shown in FIGS. 1-3, the system includes a loading module 1, a data collecting module 2 and a data processing module 3.

The loading module 1 is configured to simulate a half-sine cyclic dynamic load transmitted by a vehicle load through a pavement and a static load generated by a dead weight of a pavement structure. As shown in FIG. 2, the loading module includes a test vehicle 5, a servo cylinder 9 is mounted on the test vehicle 5, and a piston rod of the servo cylinder 9 is connected with a bearing plate 12 acting on a subgrade surface to simulate the half-sine cyclic dynamic load transmitted by the vehicle load through the pavement. An annular loading plate 22 is disposed around the bearing plate 12, the bearing plate 12 is located in the center of the loading plate 22, and the loading plate 22 is connected, through a force transmission rod 20, with a bearing tray 19 on which a counterweight block 18 is placed. The counterweight block 18 transmits a load to the loading plate 22 through the bearing tray 19 and the force transmission rod 20, and the loading plate 22 acts on the subgrade surface to simulate the static load of the dead weight of the pavement structure.

An area of the subgrade surface acted by the bearing plate 12 is matched in size with an area of the pavement contacted by a vehicle wheel so as to simulate a vehicle load. A distance between the bearing plate 12 and the loading plate 22 is 1-2 cm to ensure both of them do not interfere with each other during a test process and can represent the effect of the vehicle load on the subgrade and the constraint of the overlaid pressure of the pavement structure on the subgrade. Lower surfaces of the bearing plate 12 and the loading plate 22 are made flat and smooth to improve a loading accuracy.

Preferably, the bearing plate 12 is circular and the loading plate 22 is annular. In this case, the distance from the loading plate 22 to the center of the bearing plate 12 is equal to ensure there will be same dead weight force present in any direction, which is more approximate to an actual force bearing condition, thus accurately simulating a dead weight influence scope of the pavement. In order to truly simulate the constraint of the overlaid pressure of the pavement structure on the subgrade, it is only required to ensure that a simulated pavement static pressure intensity received by the subgrade is equal to an actual static pressure intensity. In the present invention, with the counterweight block 18 and the control of the area of the loading plate 22, a pressure intensity of a true pavement structure is simulated in the following formula: $\rho g h \times S = (m+m_0)g$, where h represents a thickness of the pavement structure layer, $\rho$ represents a density of the pavement structure layer, m represents a mass of the counterweight block 18, $m_0$ represents a sum of masses of the force transmission rod 20, the bearing tray 19 and the protective rods 17, g represents a gravitational acceleration, S represents an acting area of the loading plate 22. In the embodiment, the bearing plate 12 is a rigid plate having a diameter of 30 cm and a thickness of 5 cm, and the loading plate 22 is an annular rigid plate having an inner diameter of 31-32 cm and an outer diameter of 60 cm and a thickness of 5 cm. The loading plate 22 cannot simulate the constraint effect of the pavement dead weight in a case of excessively small diameter. When the loading plate 22 has an excessively large diameter, the thicknesses and densities of the above pavement structure corresponding to the subgrade differ greatly, leading to decreased accuracy, non-economy and inconvenience of operation.

The servo cylinder 9 is mounted on the test vehicle 5 through a first lifting cylinder 16, the bearing tray 19 is located above the servo cylinder 9, the force transmission rod 20 penetrates through the vehicular frame plate of the test vehicle 5, the bearing tray 19 is mounted on the test vehicle 5 through a second lifting cylinder 21, and the counterweight block 18 is limited by three surrounding protective rods 17. In a case of operation, the loading plate 22 is moved downward by the second lifting cylinder 21 to be in contact with the subgrade surface, compresses air in the second lifting cylinder 21 is released to allow the bearing tray 19 to be only supported by the force transmission rod 20 and the loading plate 22, and then the counterweight block 18 is placed on the bearing tray 19 so as to simulate a weight of a pavement structure by use of the loading plate 22. The counterweight block 18 has a loading range of 0-5 kN and is adjustable 0.25 kN/level.

The servo cylinder 9 has a maximum vertical amplitude of ±25 mm with an indication accuracy being ±0.5% FS (FS is a scale range, i.e. ±0.5%×scale, for example, the scale is 50 mm and the accuracy is ±0.25 mm), a load range being 0-10 kN, a measuring accuracy being ±1% FS and a loading frequency being 0.01-100 HZ.

The load application of the indoor test method is realized by a reaction frame but the in-situ test cannot employ the reaction frame. In the present disclosure, the vehicle dynamic load is stably simulated by applying a cyclic load to the subgrade through the servo cylinder 9. In actual test, there may be many uncertain factors. Therefore, loading feedback calibration is adopted to further improve the load application stability and accuracy. In order to ensure the actual load borne by the subgrade is numerically consistent with the input load of the computer 7, the following calibration system is disposed: the piston rod of the servo cylinder 9 is connected with the bearing plate 12 through a connection rod 13, a load sensor 14 is mounted between the piston rod of the servo cylinder 9 and the connection rod 13, the load sensor 14 is connected with the piston rod of the servo cylinder 9 through a sensor connector 15, the sensor connector 15 achieves the connection effect, and the load sensor 14 is connected with the computer 7 through an internal wire. The computer 7 is used to compare a monitoring value of the load sensor 14 with a load value input into the servo cylinder 9, and correct the input load of the computer 7 to be consistent with the monitoring value of the load sensor 14 when the monitoring value and the input load value are different. The input load of the servo cylinder 9 is determined according to the dynamic load of the vehicle load on the subgrade so as to simulate the vehicle load of the subgrade.

Over-limit protection: in a case of ensuring accuracy, the piston rod of the servo cylinder 9 will not be too long. Therefore, the connection rod 13 having an adjustable length is connected between the piston rod of the servo cylinder 9 and the bearing plate 12 to adapt to different height positions of the bearing plate 12. A magnetostrictive linear displacement sensor 10 is connected with the piston rod of the servo cylinder 9 through a first sensor fixture 11, a pin of the magnetostrictive linear displacement sensor 10 is fixed on a vehicular frame plate of the test vehicle 5, and the magnetostrictive linear displacement sensor 10 is in signal connection with the computer 7. When the piston rod of the servo cylinder 9 is displaced, the magnetostrictive linear displacement sensor 10 will change in reading and provide a feedback about the position of the piston rod of the servo cylinder 9. The computer 7 determines whether the piston rod of the servo cylinder 9 telescopes within a scale range based on the feedback about the position of the piston rod of the servo cylinder 9. When the piston rod exceeds the scale range, the computer 7 sends a warning instruction for replacing a connection rod 13 of appropriate length to ensure the piston rod of the servo cylinder 9 telescopes within the scale range, thus ensuring the accuracy of loading data.

The data collecting module 2 is configured to collect test process data. As shown in FIG. 3, the data collecting module 2 includes a second high precision displacement sensor 34 and a plurality of first high precision displacement sensors 29. The second high precision displacement sensor 34 is mounted at the center of the bottom of the bearing plate 12, the first high precision displacement sensors 29 are mounted on an upper surface of the loading plate 22 and test points of the subgrade surface respectively, the second high precision displacement sensor 34 and the first high precision displacement sensors 29 are in signal connection with the computer 7, and the test points of the second high precision displacement sensor 34 and all the first high precision displacement sensors 29 are on a same straight line. In this way, a deflection basin curve can be measured out, facilitating inverse calculation of the dynamic resilient modulus.

The first high precision displacement sensors 29 are symmetrically disposed at both sides of the second high precision displacement sensor 34, a horizontal distance between the first high precision displacement sensor 29 on the upper surface of the loading plate 22 and the second high precision displacement sensor 34 is minimum, a horizontal distance between the second high precision displacement sensor 34 and other first high precision displacement sensors 29 increases gradually toward both sides, and a distance between the first high precision displacement sensor 29 furthest from the center of the bearing plate 12 and the center of the bearing plate 12 is not greater than 5 m. Because the displacement will change more obviously at a load center, the test points are densified. The displacement change will become more gentle gradually along with a larger distance from the load center; and in a case of more than 5 m away from the load center, the displacement change will be basically 0. In this embodiment, two first high precision displacement sensors 29 are mounted on the upper surface of the loading plate 22 and have a horizontal distance of 23 cm-23.5 cm from the second high precision displacement sensor 34. Twelve first high precision displacement sensors 29 are mounted at the test points of the subgrade surface and the horizontal distances from the second high precision displacement sensor 34 are 40 cm, 80 cm, 80 cm, 80 cm, 80 cm and 80 cm respectively toward both sides. During a loading process, the loading plate 22 changes along with its bottom displacement, the probes of the first high precision displacement sensors (29) on the upper surface of the loading plate 22 are in contact with the upper surface of the loading plate 22 to truly measure its displacement change. The probes of other first high precision displacement sensors 29 are in contact with corresponding test points on the subgrade soil through steel sheets having a diameter of 5 cm. Due to uneven subgrade surface, the steel sheet having a diameter of 5 cm helps to measure a displacement far away from the exact center of the test point to ensure measurability and accuracy of the data. Basal bodies of all the first high precision displacement sensors 29 are penetrated through the cross beam 32 and fixedly connected with the cross beam 32 through a second sensor fixture 31. The cross beam 32 is mounted on the test vehicle 5 through a third lifting cylinder 30. The cross beam and the second sensor fixture 31 are helpful to stable adjustment to the first high precision displacement sensor 29, thus improving the measuring accuracy. The second high precision displacement sensor 34 and the first high precision displacement sensor 29 may be connected with the computer 7 in a wireless or wired manner. In a case of wired connection, the disposal of the cross beam 32 is favorable to line arrangement of the first high precision displacement sensor 29. The second high precision displacement sensor 34 is connected with the computer 7 through an internal wire, with the line arrangement same as the load sensor 14. The first high precision displacement sensor 29 has a measuring range of 0-22 cm, a measuring resolution of 1 μm and a measuring accuracy of ±0.5% FS.

Figure 4:
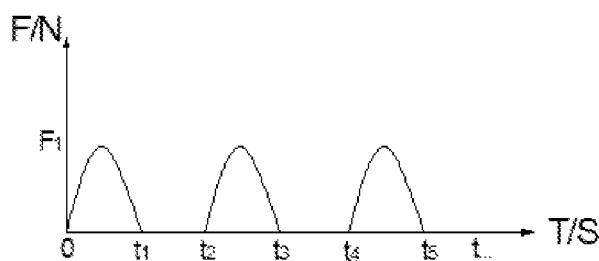
FIG. 4 is a typical load waveform diagram of a servo cylinder according to an embodiment of the present invention.
Figure 4:
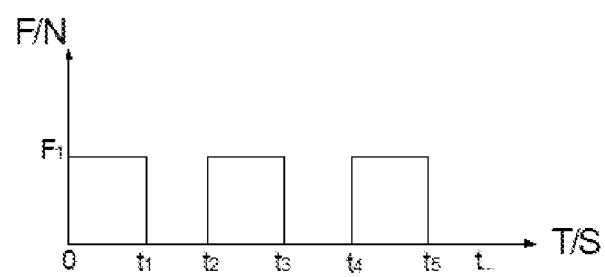
Figure 4:
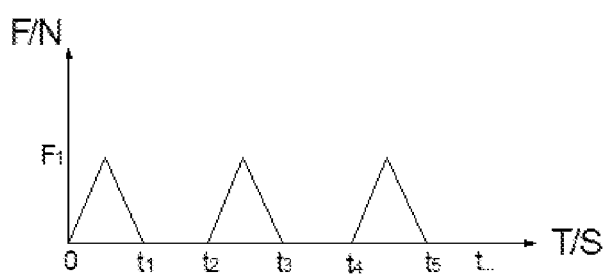

The data processing module 3 is configured to set a loading waveform, a load size, a loading frequency and a number of loading times of a pre-applied vehicle load, and perform inverse calculation for a dynamic resilient modulus value of a subgrade according to the applied vehicle load and the collected resilient deformation displacement values of various test points of the subgrade surface. The data processing module 3 includes a computer 7, and the computer 7 is connected with a signal input end of the servo cylinder 9 to set an input load of the servo cylinder 9. With the load waveforms (sinusoidal wave, rectangular wave, triangular wave) shown in FIG. 4, the abscissa is time t which is determined based on a travel speed, and the ordinate is the loading force F which is determined based on the weight of vehicle, and different waveforms and loading forces are used to simulate different vehicle loads. Generally, the sinusoidal wave is adopted to simulate a vehicle load. To increase the applicability of the equipment and improve the scientific technology, other waveforms are also added. The computer 7 is in signal connection with the output ends of the first high precision displacement sensor 29 and the second high precision displacement sensor 34 to record the resilient deformation displacement values of various test points and inversely calculate the dynamic resilient modulus value of the subgrade through a software.

The test system further includes Beidou positioning device 33, Global Positioning System (GPS), Galileo satellite navigation system, or GLONASS system to accurately position a test point coordinate of each in-situ test and send the test point coordinate to the computer 7. In this way, it is avoided that a pile number is unidentifiable when highway is opened to traffic. The test point coordinate is sent to the computer 7 such that the data can be easily searched and invoked. Alternatively, the coordinate information may also be imported to the test reports, making it clear.

The test system further includes a trail car 6 used to trail the test vehicle 5. The data processing module 3 is mounted on the trail car 6. An oil tank of the trail car 6 is used to provide gasoline source to an electro-hydraulic servo loading system 8 and supply power to the test system at the same time. The total power of the test system is 11 KW. The electro-hydraulic servo loading system 8 converts gasoline into a loading power of the servo cylinder 9.

The test system further includes a controlling module 4 to realize integration of various modules, data collection of various types of sensors, necessary over-load and limit protections and servo control functions and the like, where the controller and the control software employed are well known in the prior art. Over-load and limit protections: on the one hand, program is set not to exceed a given load and displacement. For example, when the displacement of the piston rod of the servo cylinder 9 exceeds a scale range, it is required to use an appropriate connection rod 13. If the test data of the first high precision displacement sensor 29 goes beyond a measuring range of the sensor, a warning will be sent to re-adjust a contact distance of the first high precision displacement sensor 29 and the corresponding test point. On the other hand, a correction system is in-built: by continuously correcting the input value of the computer 7 based on the feedback of the actual measured value of the load sensor 14, the load application stability and accuracy of the servo cylinder 9 are improved.

Embodiment 1

Provided is an in-situ test method of the in-situ test system for a subgrade dynamic resilient modulus. The method includes the following steps.

At step S1, test points are selected along a same straight line on a subgrade surface to be tested, then the subgrade surface is leveled by use of a tool (pry, spade, and knife and the like), and then measured for levelness using a level meter to ensure the subgrade surface to be tested is horizontal.

At step S2, the test car 5 is trailed by the trail car 6 to the leveled subgrade surface to be tested. The first lifting cylinder 16, the second lifting cylinder 21 and the third lifting cylinder 30 are started to descend the bearing plate 12, the loading plate 22 and the cross beam 32 to corresponding positions respectively, such that the bearing plate 12 and the loading plate 22 both are in full contact with the subgrade surface. The center of the bottom of the bearing plate 12 is located at a middle test point, the second high precision displacement sensor 34 and the first high precision displacement sensors 29 are mounted on corresponding test points respectively, and the bearing plate 12 and the loading plate 22 are at horizontal position and spaced apart to ensure they will not interfere with each other during test process. A appropriate counterweight block 18 is placed on the bearing tray 19 according to the dead weight load of the pavement structure layer to ensure the overlaid pressure of the subgrade is equal to the dead weight pressure of the pavement structure layer. Cylinder support legs 23 mounted around the test vehicle 5 are opened and adjusted to be in contact with the ground to enable the test vehicle 5 to be horizontal and stable with the purpose of preventing the test vehicle 5 from jumping under an applied vehicle load so as to ensure the entire test system is stable. After test is completed, the cylinder support legs 23 are retracted and closely attached to the bottom surface of the test vehicle 5.

At step S3, the test system is checked and debugged to work normally. A loading waveform, a load size, a loading frequency and a number of loading times of a pre-applied vehicle load of the servo cylinder 9 are set through the computer 7 to obtain the data of Table 1. The adopted loading waveform specifically is half sine waveform shown in FIG. 4, the load is set to 3 kN, the frequency is set to 1 Hz and the number of loading times is set to 1100 times.

At step S4, the servo cylinder 9 is started to apply the vehicle load under specified parameters, and the resilient deformation displacement values of various test points are sent to the computer 7 for storage through the first high precision displacement sensors 29 and the second high precision displacement sensor 34.

At step S5, the computer 7 records one piece of test data every time the test system completes one test. The existing inverse calculation method is written into programs to form a software which is installed in the computer 7. The computer 7 performs inverse calculation for a dynamic resilient modulus value of a subgrade through the software according to the vehicle load applied by the servo cylinder (9) and the resilient deformation displacement values of various test points of the subgrade surface collected by the first high precision displacement sensors 29 and the second high precision displacement sensor 34. One subgrade dynamic resilient modulus is generated each second. The previous 1000 times of loading is a pre-applied load stage for compacting subgrade structure to enable the subgrade structure to be stable in performance and eliminate plastic deformation in a loading process. An average value of the last five subgrade dynamic resilient moduli in the last 100 times of loading is obtained as a test result.

In a test process of the in-situ test system for a subgrade dynamic resilient modulus, the magnetostrictive linear displacement sensor 10 monitors the position of the piston rod of the servo cylinder 9 in real time and feeds back to the computer 7, and the computer 7 is used to determine whether the piston rod of the servo cylinder 9 telescopes within a scale range based on the feedback about the position of the piston rod of the servo cylinder 9 and send corresponding instructions. At the same time, the computer 7 compares a real-time monitoring value of the load sensor 14 with a load value input into the servo cylinder 9, and corrects the input load of the computer 7 to be consistent with the monitoring value of the load sensor 14 when the monitoring value and the input load value are different.

The present invention has the following technical effects.

In order to obtain indoor structural modulus, a dynamic resilient modulus of the subgrade soil is obtained by using an indoor dynamic triaxial tester firstly, and then a dynamic modulus of a subgrade structure layer is calculated based on the calculation method mentioned in Designing Rules for Highway Subgrades (JTG D30-2015)—an industrial standard of The People's Republic of China. Dynamic resilient modulus test is performed for high liquid limit clay and sandy low liquid limit clay by using an indoor dynamic triaxial tester, and the dynamic resilient modulus value of the subgrade structure layer is calculated by the method indicated in the Designing Rules for Highway Subgrades and compared with the field test data of the embodiment 1 of the present invention with results shown in the Table 1.

TABLE 1

Comparison of the test results of embodiment 1 and the test results of indoor dynamic triaxial test

| Subgrade soil category | High liquid limit clay | | Sandy low liquid limit clay | |
|---|---|---|---|---|
| Structural resilient modulus value of indoor dynamic triaxial test (MPa) | 73.54 | | 90.86 | |
| Test number of embodiment 1 | 1 | 2 | 1 | 2 |
| Dynamic resilient modulus value of embodiment 1 (MPa) | 70.63 | 76.59 | 86.23 | 94.15 |
| Average value of two dynamic resilient moduli of embodiment 1 (MPa) | 73.56 | | 90.19 | |
| Difference of two dynamic resilient moduli of embodiment 1 (MPa) | 5.96 | | 7.92 | |

In Table 1, the significance of the modulus difference of the embodiment 1 of the present invention lies in that it is reflected that the results measured for the same soil quality in the same position differs little and the test accuracy is high. The test result of the embodiment 1 of the present invention is approximate to the structural resilient modulus value in the indoor dynamic triaxial test, which indicates that the accuracy and feasibility of the in-situ test system for a subgrade dynamic resilient modulus in the present invention are applicable to the field detection.

In a control embodiment 1, the counterweight block 18, the bearing tray 19, the force transmission rod 20 and the loading plate 22 are omitted, the constraint of the overlaid pressure of the pavement structure on the subgrade is cancelled, and other structures and test methods are same as the embodiment 1. The test results of the subgrade dynamic resilient modulus are shown in Table 2.

TABLE 2

Result comparison of the embodiment 1, the control embodiment 1 and the indoor dynamic triaxial test

| Subgrade soil category | High liquid limit clay | Sandy low liquid limit clay |
|---|---|---|
| Structural resilient modulus value of indoor dynamic triaxial test (MPa) | 73.54 | 90.86 |
| Dynamic resilient modulus test value of embodiment 1 (MPa) | 73.56 | 90.19 |
| Dynamic resilient modulus test value of control embodiment 1 (without pavement constraint) (MPa) | 60.72 | 78.27 |

In Table 2, due to no consideration for the constraint of the overlaid pressure of the pavement structure on the subgrade in the control embodiment 1, the test result is smaller than an actual value.

Various embodiments of the present invention are described in a relating manner with same or similar parts of various embodiments referred to each other. Each embodiment focuses on the difference from other embodiments. Especially, because the system embodiment is basically similar to the method embodiment, simple descriptions are made herein, and reference may be made to the method embodiment for the related parts.

The above descriptions are only made to the preferred embodiments of the present invention and shall not be intended to limit the scope of protection of the present invention. Any changes, equivalent substitutions and improvements and the like made within the spirit and principle of the present invention shall all fall within the scope of protection of the present invention.

What is claimed is:

1. An in-situ test system for a subgrade dynamic resilient modulus, comprising a loading module (1), a data collecting module (2) and a data processing module (3); wherein,
the loading module (1) comprises a test vehicle (5), a servo cylinder (9) is mounted on the test vehicle (5), a piston rod of the servo cylinder (9) is connected with a bearing plate (12) acting on a subgrade surface, an annular loading plate (22) is disposed around the bearing plate (12), the bearing plate (12) is located in the center of the loading plate (22), and the loading plate (22) is connected, through a force transmission rod (20), with a bearing tray (19) on which a counterweight block (18) is placed;
the data collecting module (2) comprises a second high precision displacement sensor (34) and a plurality of first high precision displacement sensors (29), the second high precision displacement sensor (34) is mounted at the center of the bottom of the bearing plate (12), the first high precision displacement sensors (29) are mounted on an upper surface of the loading plate (22) and test points of the subgrade surface respectively, the test points of the second high precision displacement sensor (34) and all the first high precision displacement sensors (29) are on a same straight line, all the first high precision displacement sensors (29) are mounted on a cross beam (32), and the cross beam (32) is mounted on the test vehicle (5) through a lifting device;
the data processing module (3) comprises a computer (7), the computer (7) is connected with a signal input end of the servo cylinder (9), an output end of the first high precision displacement sensor (29) and an output end of the second high precision displacement sensor (34) respectively, and the computer (7) is used to set a loading waveform, a load size, a loading frequency and a number of loading times of a pre-applied vehicle load of the servo cylinder (9), receive a resilient deformation displacement value tested by the second high precision displacement sensor (34) and the first high precision displacement sensor (29), and perform inverse calculation for a dynamic resilient modulus value of a subgrade using a software.

2. The in-situ test system according to claim 1, wherein an area of the subgrade surface acted by the bearing plate (12) is consistent with an area of a pavement contacted by a vehicle wheel, and a gap between the bearing plate (12) and the loading plate (22) is 1-2 cm.

3. The in-situ test system according to claim 2, wherein the bearing plate (12) is circular and the loading plate (22) is annular.

4. The in-situ test system according to claim 3, wherein the bearing plate (12) has a diameter of 30 cm, and the loading plate (22) has an inner diameter of 31-32 cm and an outer diameter of 60 cm.

5. The in-situ test system according to claim 1, wherein lower surfaces of the bearing plate (12) and the loading plate (22) are flat and smooth.

6. The in-situ test system according to claim 1, wherein the first high precision displacement sensors (29) are symmetrically disposed at both sides of the second high precision displacement sensor (34), a horizontal distance between the first high precision displacement sensor (29) on the upper surface of the loading plate (22) and the second high precision displacement sensor (34) is minimum, a horizontal distance between the second high precision displacement sensor (34) and other first high precision displacement sensors (29) increases gradually toward both sides, and a distance between the first high precision displacement sensor (29) furthest from the center of the bearing plate (12) and the center of the bearing plate (12) is not greater than 5 m.

7. The in-situ test system according to claim 1, wherein a probe of the first high precision displacement sensor (29) on the upper surface of the loading plate (22) is in contact with the upper surface of the loading plate (22), and probes of other first high precision displacement sensors (29) are in contact with corresponding test points on the subgrade soil through a steel sheet having a diameter of 5 cm.

8. The in-situ test system according to claim 7, basal bodies of all the first high precision displacement sensors (29) are penetrated through the cross beam (32) and fixedly connected with the cross beam through a second sensor fixture (31).

9. The in-situ test system according to claim 1, wherein three vertically-disposed protective rods (17) are uniformly arranged around the counterweight block (18), and with the limitation of the protective rods (17), the counterweight block (18), the force transmission rod (20), the bearing tray (19) and the protective rods (17) join together to apply a loading force to the subgrade surface, with the loading force ranging from 0.25 kN to 5 kN and adjustable 0.25 kN per level.

10. The in-situ test system according to claim 1, wherein a magnetostrictive linear displacement sensor (10) is connected with the piston rod of the servo cylinder (9) through a first sensor fixture (11), a pin of the magnetostrictive linear displacement sensor (10) is fixed on a vehicular frame plate of the test vehicle (5), and the magnetostrictive linear displacement sensor (10) is in signal connection with the computer (7); the computer (7) is used to determine whether the piston rod of the servo cylinder (9) telescopes within a scale range according to a position feedback of the piston rod of the servo cylinder (9).

11. The in-situ test system according to claim 10, wherein the piston rod of the servo cylinder (9) is connected with the bearing plate (12) through a connection rod (13), a load sensor (14) is mounted between the piston rod of the servo cylinder (9) and the connection rod (13), the load sensor (14) is in signal connection with the computer (7), and the computer (7) is used to compare a monitoring value of the load sensor (14) with a load value input into the servo cylinder (9), and correct the input load of the computer (7) to be consistent with the monitoring value of the load sensor (14) when the monitoring value and the input load value are different.

12. The in-situ test system according to claim 1, wherein the servo cylinder (9) is mounted on the test vehicle (5) through a first lifting cylinder (16), the bearing tray (19) is located above the servo cylinder (9), the force transmission rod (20) penetrates through the vehicular frame plate of the test vehicle (5), the bearing tray (19) is mounted on the test vehicle (5) through a second lifting cylinder (21), and the cross beam (32) is mounted on the test vehicle (5) through a third lifting cylinder (30).

13. The in-situ test system according to claim 11, wherein the servo cylinder (9) has a maximum vertical amplitude of ±25 mm with an indication accuracy being ±0.5% FS, a load range being 0-10 kN, a measuring accuracy being ±1% FS and a loading frequency being 0.01-100 HZ.

14. The in-situ test system according to claim 8, wherein the first high precision displacement sensor (29) has a measuring range of 0-22 mm, a measuring resolution of 1 μm, and a measuring accuracy of ±0.5% FS.

15. The in-situ test system according to claim 1, further comprising: any one of Beidou positioning device (33), Global Positioning System (GPS), Galileo satellite navigation system, and GLONASS system to accurately position a test point coordinate of each in-situ test and send the test point coordinate to the computer (7).

16. The in-situ test system according to claim 1, further comprising: a trail car (6) for trailing the test vehicle (5), wherein an oil tank of the trail car (6) provides gasoline source to an electro-hydraulic servo loading system (8) and supplies power to the test system at the same time; the electro-hydraulic servo loading system (8) converts gasoline into a loading power of the servo cylinder (9).

17. An in-situ test method for a subgrade dynamic resilient modulus, employing the in-situ test system for a subgrade dynamic resilient modulus according to claim 1, and comprising the following steps:
- at step S1, selecting test points along a same straight line on a subgrade surface to be tested, and leveling the subgrade surface;
- at step S2, trailing the test vehicle (5) to the leveled subgrade surface to be tested to enable the bearing plate (12) and the loading plate (22) to be in full contact with the subgrade surface, wherein the center of the bottom of the bearing plate (12) is located at a middle test point, the second high precision displacement sensor (34) and the first high precision displacement sensors (29) are mounted on corresponding test points respectively, and the bearing plate (12) and the loading plate (22) are at horizontal position and spaced apart; mounting an appropriate counterweight block (18) according to a dead weight load of a pavement structure layer, and adjusting the test vehicle (5) to be horizontal and stable;
- at step S3, setting a loading waveform, a load size, a loading frequency and a number of loading times of a pre-applied vehicle load of the servo cylinder (9) through the computer (7);
- at step S4, starting the servo cylinder (9) to apply a vehicle load under specified parameters, and transmitting resilient deformation displacement values of various test points to the computer (7) through the first high precision displacement sensors (29) and the second high precision displacement sensor (34); and
- at step S5, performing, by the computer (7), inverse calculation for a dynamic resilient modulus value of a subgrade through a software according to the vehicle load applied by the servo cylinder (9) and the resilient deformation displacement values of various test points of the subgrade surface collected by the first high precision displacement sensor (29) and the second high precision displacement sensor (34).

* * * * *